United States Patent [19]

Natali et al.

[11] Patent Number: 5,696,762
[45] Date of Patent: Dec. 9, 1997

[54] RAPID-ACQUISITION ACCESS CHANNEL SCHEME FOR CDMA SYSTEMS

[75] Inventors: Francis Natali, Townsend, Wash.; John Ohlson, Mt. View, Calif.

[73] Assignee: Stanford Telecommunications, Inc., Sunnyvale, Calif.

[21] Appl. No.: 621,500

[22] Filed: Mar. 25, 1996

[51] Int. Cl.$^6$ ............................................. H04B 7/216
[52] U.S. Cl. ........................ 370/320; 370/342; 375/206
[58] Field of Search .................................. 370/320, 324, 370/335, 342, 350, 441, 479; 375/206–208, 354, 356, 367; 455/54.1, 56.1

[56] References Cited

U.S. PATENT DOCUMENTS

| | | | |
|---|---|---|---|
| 5,359,625 | 10/1994 | Vander et al. | 375/206 |
| 5,383,219 | 1/1995 | Wheatley, III et al. | 370/209 |
| 5,414,728 | 5/1995 | Zehavi | 375/200 |
| 5,488,629 | 1/1996 | Takahashi et al. | 375/206 |
| 5,511,067 | 4/1996 | Miller | 370/335 |
| 5,577,025 | 11/1996 | Skinner et al. | 370/342 |

*Primary Examiner*—Douglas W. Olms
*Assistant Examiner*—A. Bnimoussa
*Attorney, Agent, or Firm*—Jim Zegeer, Esq.

[57] ABSTRACT

A spread spectrum CDMA communication system in which a station transmits a short synchronization signal to allow a second station to (1) recognize that a signal is present, (2) resolve frequency uncertainty, (3) acquire the spreading code timing, (4) acquire frame and symbol synchronization, and (5) demodulate data which may contain user identification and other data. The rapid acquisition channel (RAC) includes a burst signal comprising of an Acquisition Field during which the carrier is biphase modulated with a pseudo-noise (PN) sequence, a Sync Field during which a synchronization sequence is mod-2 added to the PN sequence with one chip of the sync sequence equal to one or more periods of the PN sequence, and a data field with m-ary orthogonal code words mod-2 added to the PN sequence with one chip of the code word equal to one or more periods of the PN sequence.

8 Claims, 9 Drawing Sheets

| Acquisition Field | | |
|---|---|---|
| Field Length | 180 ms | |
| PN m-sequence length | 255 chips | |
| PN primitive polynomial | $x^5 + x^4 + x^3 + x^2 + 1$ | |
| Chipping rate, Rc | 272 kcps | |
| Number of PN periods in Field | 192 | |
| Modulation | bi-phase | |
| Frame and Symbol Sync Field | | |
| Field Length | 30 ms | |
| PN m-sequence length | as above | |
| PN Chipping rate, Rc | as above | |
| Sync word | 00011101 | |
| Sync word chip rate | 34 kcps | |
| Number of repeats | 4 | |
| Data Field | | |
| Field Length | 160 ms | |
| PN m-sequence length | as above | |
| PN Chipping rate, Rc | as above | |
| Data modulation | 8-ary orthogonal bi-phase | |
| Symbol rate | 133.33 Hz | |
| Symbol period | 7.5 ms | |
| Symbols in data field | 20 | |
| Number of data bits in field | 60 | |

Figure 4

RAPID-ACQUISITION ACCESS CHANNEL SCHEME FOR CDMA SYSTEMS

BACKGROUND AND BRIEF DESCRIPTION OF PRIOR ART

Spread spectrum communications is presently being used for a number of commercial applications and is expected to proliferate as the demand for untethered communications increases. One example of this is the IS-95 standard for cellular telephones. This system uses orthogonal CDMA (OCDMA) on the outbound links and nonsynchronous CDMA on the inbound links.

Another example of commercial application of spread spectrum techniques is the orthogonal CDMA (OCDM) system discussed for an office PBX system by Magill, et al, in "Spread-Spectrum Technology for Commercial Applications", Proc. of the IEEE, June 1994. In this case, the base station of this star-configured network transmits a set of orthogonal Walsh functions which are overlaid with a pseudo-noise (PN) sequence. Each orthogonal function carries voice or data for a single user. See M. J. E. Golay, IDA Report 108, pg. 110 (1965) which discloses this basic signal format.

The discussion by Magill, et al, is for a short range system in which it makes sense to provide TDMA time slots on the return link for network members to transmit a signal for timing and synchronization purposes. In this manner, an empty slot is reserved for a member to enter the net at any time. This technique becomes inefficient and is not useful when the path lengths are long and the propagation time varies considerably between users, such as in a satellite system.

A number of consortiums have been formed to develop satellite based Personal Communications Systems (PCS) with global coverage. Some examples of these systems include Globalstar (Globalstar System Application before the FCC by Loral Cellular Systems, Corp., Jun. 3, 1991) and Odyssey (Application of TRW Inc. before the FCC to Construct a New Communications Satellite System "Odyssey," May 31, 1991), among others. The intent of these systems is that a subscriber can place telephone calls directly through the satellite network from almost anywhere on the Earth, using a portable handset much like the present cellular telephones. Both of the systems mentioned intend to use spread spectrum CDMA techniques for a number of reasons.

The return link CDMA signal is generally difficult to acquire, especially in satellite systems, due to the relatively large time and frequency uncertainty of the received signal and the low received signal power. The acquisition process may be aided by transmitting an auxiliary signal in a designated channel. This signal, in conjunction with a suitable receiver, should be designed so the receiver can acquire the signal quickly, estimate carrier frequency and time-of-arrival accurately, and demodulate data. One means for performing these functions is described in the patent application, "Network Entry Channel for CDMA systems," U.S. application Ser. No. 08/358,078.

The present invention relates to a unique signaling and receiver combination that makes maximum use of matched filter and noncoherent reception techniques to achieve very rapid acquisition and robust performance in the presence of multipath. This signaling and receiver combination is called the Return Access Channel (RAC). It is applicable to both satellite and terrestrial communication systems.

OBJECTS OF THE INVENTION

The invention described below is intended to serve several functions and objectives. These are summarized as:

Provide a system for rapidly acquiring the RAC with relatively large uncertainty in carrier frequency and time-of-arrival.

Perform robust signal acquisition with relatively low received signal levels.

Provide the user with a high link margin, low data rate channel for net entry requests.

Provide a system in which the receiver accurately estimates the received signal time-of-arrival and carrier frequency.

Provide means for accessing an OCDMA network on a noninterfering basis without prior time and frequency synchronism.

Allows the hub station to detect and synchronize the user before assigning an orthogonal function for OCDMA operation.

The invention has the following novel features

1. The RAC waveform and receiver are designed and configured to take maximum advantage of matched filter and noncoherent detection techniques. The unique combination of these techniques results in rapid acquisition, efficient time ambiguity resolution and symbol synchronization, as well as efficient data detection even in the presence of multipath. It further results in a very efficient receiver hardware implementation.

2. The RAC receiver uses a single shift register with multiple weighting networks to synthesize a bank of filters matched to the PN sequence and with center frequencies that span the initial carrier frequency uncertainty. The filter outputs are combined noncoherently to increase the probability of detection without narrowing the matched filter input bandwidth. The summed outputs for each frequency bin are stored for all sample times in a code period. The resultant two dimensional table is scanned for time/ frequency bins which contain an entry large enough to indicate signal presence. This results in very fast and reliable signal detection.

3. The above configuration allows multiple signals to be processed simultaneously, as long as they are separated in time-of-arrival by more than one PN code chip interval.

4. Frame and symbol sync are achieved by further noncoherent matched filter processing of the signal correlation peaks from the input MF. This is a process that is both rapid and robust in the presence of multipath.

5. Transmission of the data by 8-ary orthogonal code words allows noncoherent data detection, which is robust in multipath, while maintaining good power efficiency.

DESCRIPTION OF THE DRAWINGS

The above and other objects, advantages and features of the invention will become more clear when considered with the following specification and accompanying drawings, wherein:

FIG. 4 is a table of RAC signal parameter summary;

DETAILED DESCRIPTION OF THE INVENTION

Figure 1:
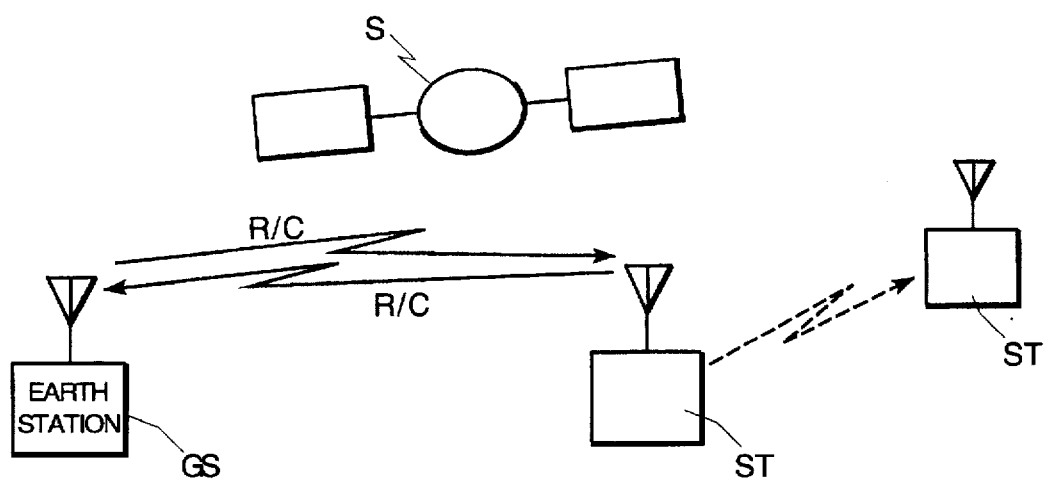
FIG. 1 is a typical satellite radio communication system incorporating the invention.

The embodiment as discussed here relates to the return link of a star configured spread spectrum satellite network of the type shown in FIG. 1, but it can also be applied to appropriate terrestrial systems. The satellite receives the user signal from the ground and transponds it to a hub ground station (GS). The return link signal structure described below incorporates CDMA with a separate Return Access Channel (RAC).

The Subscriber Terminal (ST) transmits an Return Access Channel (RAC) signal to alert the Earth Station (ES) that he wishes to place or receive a call. This signal is acquired by the ES which makes an estimate of the ST time and frequency offsets as well as demodulating RAC data which includes a temporary Identification (ID) word as well as a priority designation for 911 use. In the case of an Orthogonal CDMA (OCDMA) system, appropriate time and frequency corrections are computed at the ES and transmitted back to the ST on the Forward Link (F/L) control channel, along with a traffic channel assignment. The ST can then switch to the Return Link (R/L) traffic channel and begin call set up. The description given assumes parameters values which were chosen for illustrative purposes.

RAC Signal Description

Figure 2:
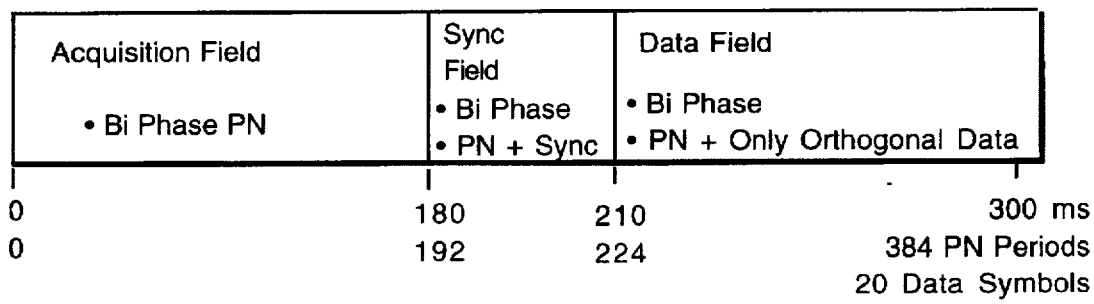
FIG. 2 illustrates the return access channel (RAC) burst signal structure.

The RAC signal is a spread spectrum burst signal which consists of three parts as shown in FIG. 2, the Acquisition Field, the Frame and Symbol Sync Field, and the Data Field.

The Acquisition Field

Figure 3:
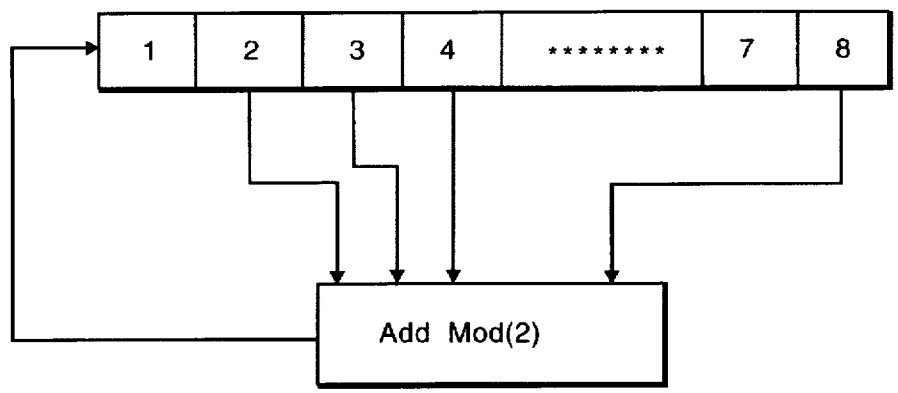
FIG. 3 is a block diagram of a linear shift register generator for RAC signal length 255 PN sequence.

The Acquisition Field is a length 255 PN m-Sequence which bi-phase modulates the carrier. The chipping rate is 272 kcps and the code is repeated 192 times, corresponding to 180 ms. The signal parameters are summarized in the Table shown in FIG. 3. The PN sequence is characterized by the primitive polynomial $p(x)=X^8+X^4+X^3+X^2+1$ and is generated by the linear shift register generator of FIG. 3.

Frame and Symbol Sync Field

The Frame and Symbol Sync Field is distinguished from the Acquisition Field in that a length 8 Neuman-Hofman synchronization word is mod(2) added to the PN spreading sequence before bi-phase modulation of the signal. One symbol of the sync word is exactly a PN sequence long. The spreading sequence and sync word transitions are synchronized to occur at the same time. The Sync Field is 30 ms long, which corresponds to 32 repetitions of the PN code and 4 repetitions of the sync word. The sync sequence is 00011101. These parameters are summarized in FIG. 4.

Data Field

The Data Field modulation is bi-phase using 8-ary orthogonal waveforms which are spread with the same spreading sequence as described above. A data symbol is exactly 8 PN code periods long, which gives a symbol rate of 133.33 sps. Each chip of the orthogonal code word is exactly one PN sequence long. The orthogonal code word set is shown in the Table below. The Data Field is 160 ms long, which corresponds to 20 data symbols or 60 data bits. These parameters are summarized in the Table shown in FIG. 4.

TABLE

| | | | | | | | | |
|---|---|---|---|---|---|---|---|---|
| 1 | 1 | 1 | 1 | 1 | 1 | 1 | 1 | 1 |
| 2 | 1 | −1 | 1 | 1 | −1 | 1 | −1 | −1 |
| 3 | 1 | 1 | 1 | −1 | 1 | −1 | −1 | −1 |
| 4 | 1 | 1 | −1 | 1 | −1 | −1 | −1 | 1 |
| 5 | 1 | −1 | 1 | −1 | −1 | −1 | 1 | 1 |
| 6 | 1 | 1 | −1 | −1 | −1 | 1 | 1 | −1 |
| 7 | 1 | −1 | −1 | −1 | 1 | 1 | −1 | 1 |
| 8 | 1 | −1 | −1 | 1 | 1 | −1 | 1 | −1 |

Receiver Architecture

Figure 5:
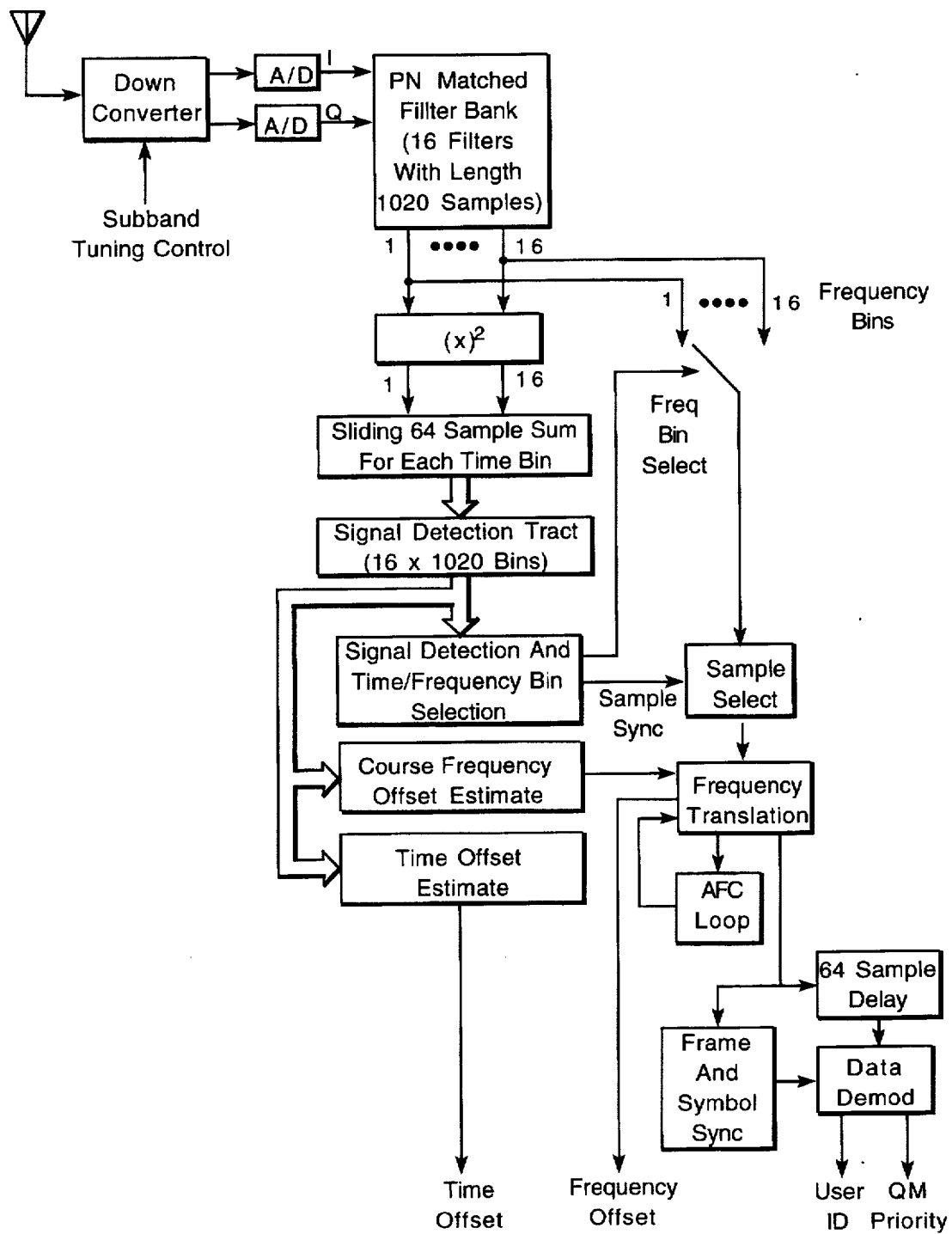
FIG. 5 is a block diagram of the RAC receiver with parallel matched filter time and frequency processing.

The RAC receiver described here, and shown in FIG. 5, is conceptually a bank of 16 parallel matched filters (matched to the PN sequence) which span the initial frequency uncertainty of ±3 kHz. The matched filter (MF) outputs are noncoherently combined by a sliding accumulator (64 samples long) for each time bin, resulting in a two-dimensional array of power measurements which covers 16 frequencies and 1020 time offsets (corresponding to 4 samples per PN chip). Signal detection is performed based on the data in this table (called the Signal Detection Table). Detection will occur within about 70 ms of signal reception, Note that multiple signals can be processed in parallel.

When a signal is detected, the sample time/frequency bin corresponding to a correlation peak is selected arid the complex samples are routed to the demodulator. A separate demodulator path is required for each signal to be processed, An estimate of time offset is performed based on the data of the Signal Detection Table. The ambiguity resolution capability of the PN code is approximately +0.5 ms. An increased ambiguity resolution capability of ±4 ms is obtained With the symbol sync operation as is described later herein.

A coarse estimate of frequency offset is also performed on the detected signal using a quadratic polynomial fit to the power in three adjacent frequency bins of the signal detection table. This frequency estimate is used to reduce the baseband frequency offset of the received signal.

A cross product AFC loop is then enabled to perform a "fine" frequency estimate and further reduce the frequency offset. This loop has a bandwidth of about 30 HZ and settles in less than 50 ms. The combined results of the "coarse" and "fine" frequency estimates are processed to derive an accurate frequency estimate of frequency offset.

The frequency corrected samples corresponding to the MF correlation peaks for a particular signal are routed to the frame and symbol sync detector. This operation is performed by an 8-bit matched filter followed by noncoherent combining (4 samples).

Once frame and symbol sync are established, data demodulation can begin. This is accomplished by processing the received signal samples in a band of abit filters matched to the orthogonal code word set. Each of these functions is examined in more detail below.

Signal Detection

Figure 6:
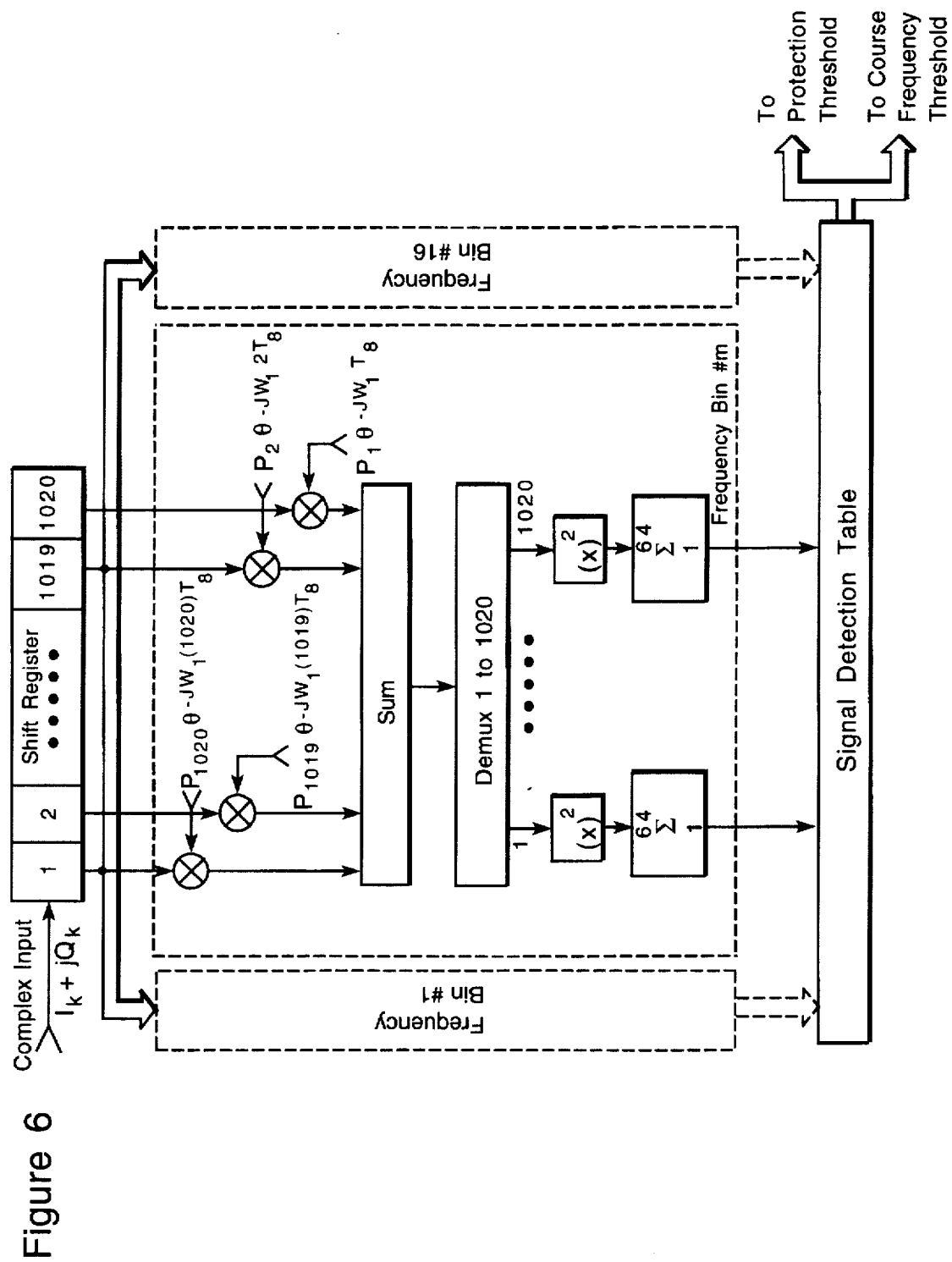
FIG. 6 is a functional block diagram of the matched filter (MF) algorithm.

The received signal is applied to the equivalent of a bank of 16 matched filters, each of length 1020 (corresponding to 4 samples per chip and 255 chips), as shown in FIG. 6. These filters are implemented with a single shift register whose outputs are weighted by the PN sequence as well as the sinusoid values corresponding to the desired matched filter center frequency.

Figure 7:
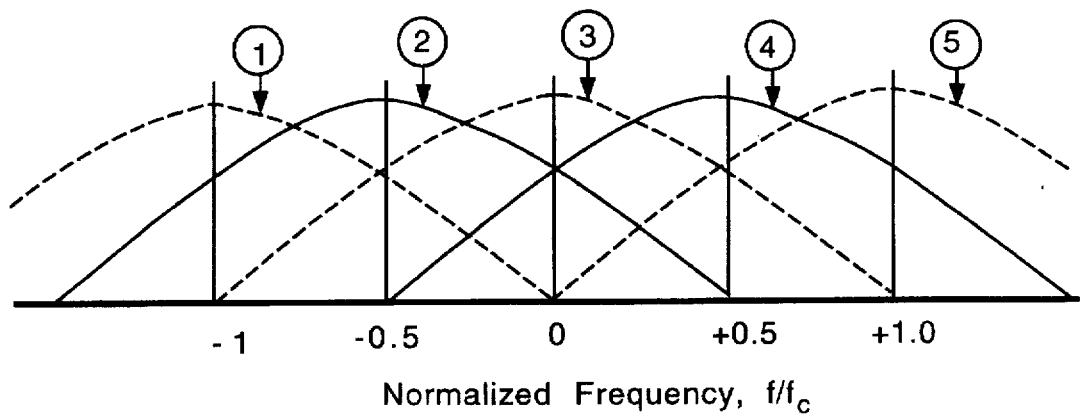
FIG. 7 is a graph illustrating the receiver DFT frequencing bins.

The filters are spaced at 533.3 Hz (one-half the PN code repetition rate) and overlap as shown in FIG. 7. The magnitude squared of each filter output is accumulated over 64 code periods for each time bin offset. This noncoherent combining serves a dual purpose. First, it limits the length of the digital MF while still providing good detection performance at low signal levels. Secondly, the frequency bin bandwidth would be greatly reduced, thus requiring many more bins if the filter were lengthened in a coherent fashion. The MF is updated at a 1.088 mHz rate (4 times per chip).

Figure 8:
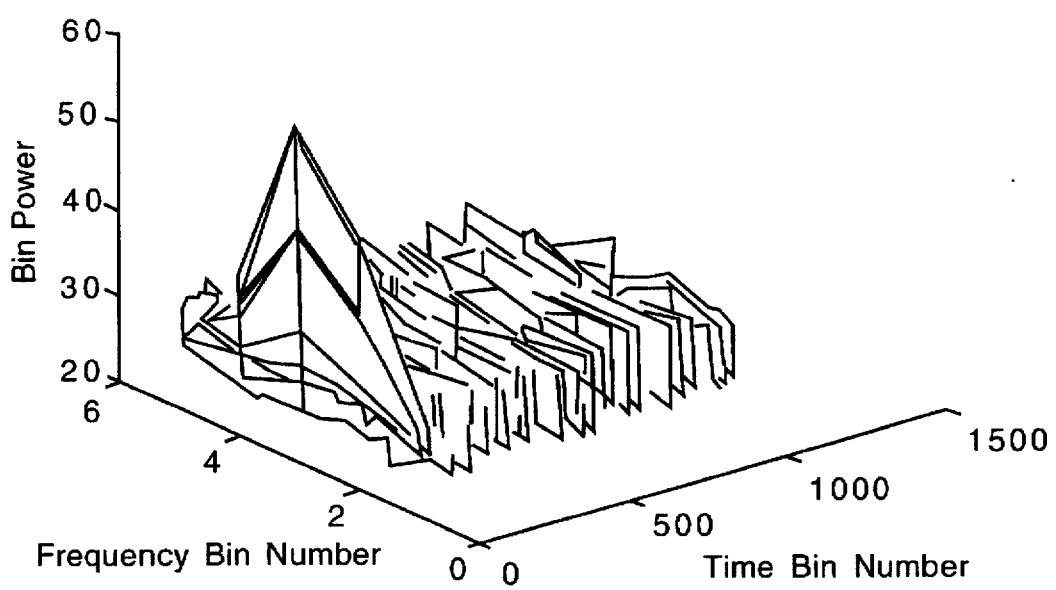
FIG. 8 is a partial plot of the signal detection table for C/No=36 dB-Hz, and sum of 64 power samples for each time bin, the signal being centered in frequency bin #3 and time bin #3.
Figure 9:
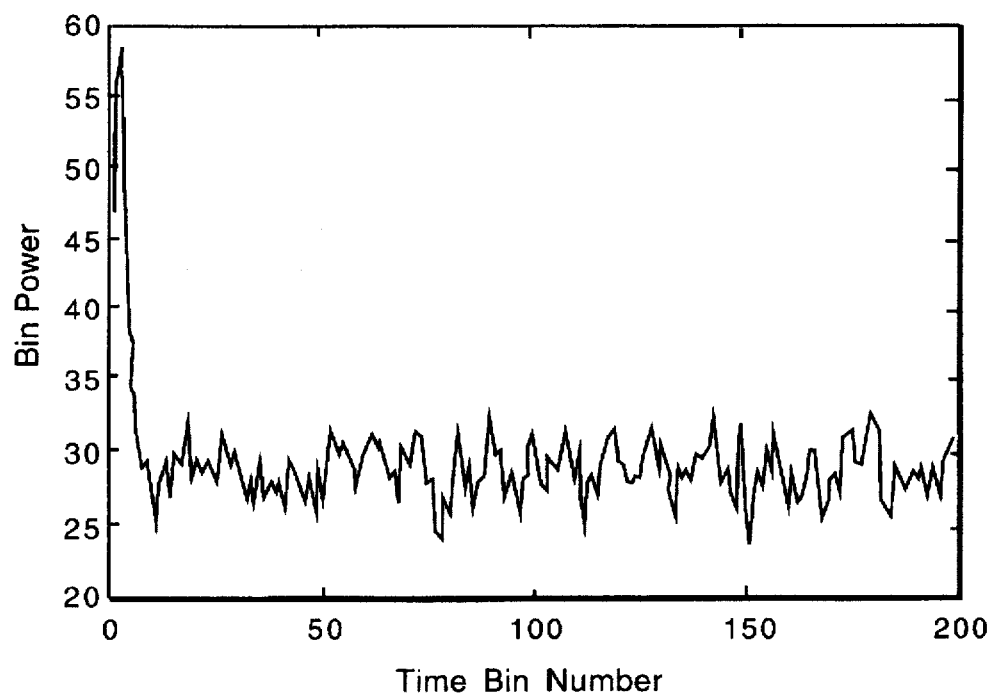
FIG. 9 illustrates the matched filter (MF) output for frequency bin #3 and time bins 1 through 200 with C/No 36 dB-Hz, and sum of 64 power samples for each time bin.

The summed MF output powers are used to construct a two-dimensional Signal Detection Table (SDT) with a total of 16,320 time/frequency bins corresponding to 16 frequencies and 1020 time offsets. A partial plot of the Signal Detection Table (SDI-) derived by computer simulation is shown in FIG. 8. Note that the correlation peak occurs is frequency bin #3, and time bin #3. A cross section of this plot for frequency bin #3 is shown in FIG. 8.

Figure 10:
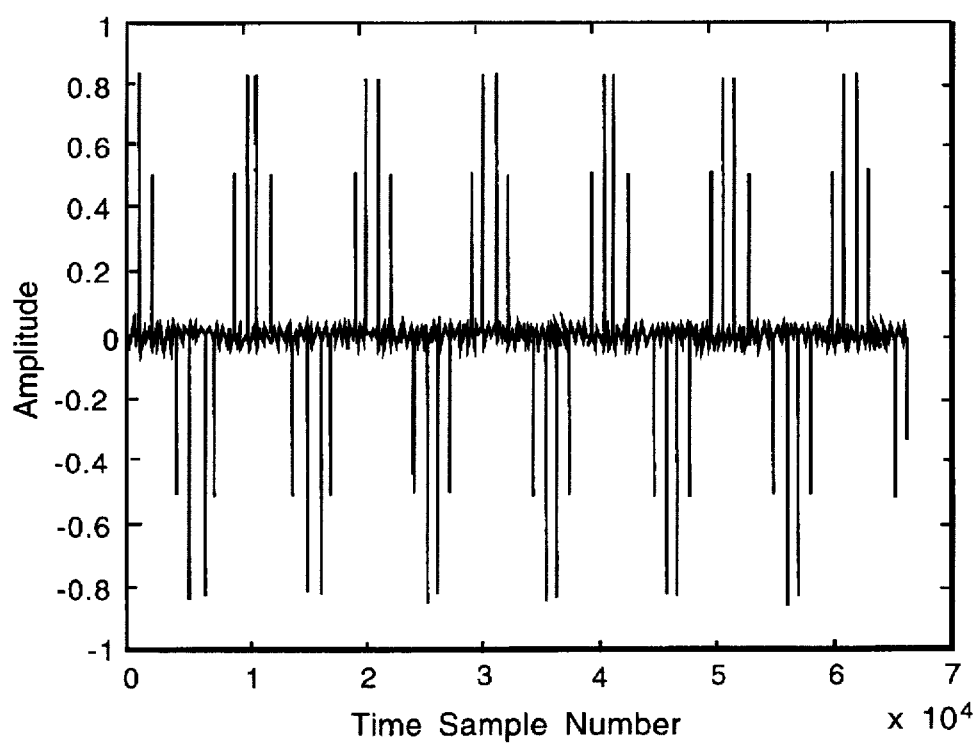
FIG. 10 illustrates the real part of the couplex MF output with a frequency offset 0.1 of the PN code repetition rate.

All of the entries in the SDT are updated each PN code period (approximately 1 ms). The contents of the table are examined for the largest entry that has not been designated as a signal within the previous 360 ms. Signal detection is declared if this entry exceeds the detection threshold. The frequency bin number of a bin where detection has been declared corresponds to one of the MF outputs shown in FIG. 6, while the time bin corresponds to samples associated with a particular reference clock timing. Thus, once a signal is detected, the associated signal samples can be routed to the data demodulator as shown in FIG. 4. This results in an effective decimation by a factor of 1020 in the number of samples to be processed. The MF output before decimation is shown in FIG. 10. The uncorrected frequency offset results in a sinusoid at baseband which modulates the correlation peaks. Note that correlation peaks occur every 1020 samples.

Frequency Estimate

The RAC receiver performs three frequency estimates is order to reduce the frequency offset sufficiently to allow data demodulation with little degradation as well as to facilitate traffic channel entry. The estimates are performed sequentially by:

1. The signal detection frequency bin number indicates frequency offset with an accuracy of approximately ±1 kHz accuracy.

2. A "coarse" frequency estimate is obtained by using a quadratic fit to entries in the SDT as described below. This gives an accuracy of about ±30 Hz, 3. "Fine" frequency tracking is enabled with a cross product AFC loop.

Figure 13:
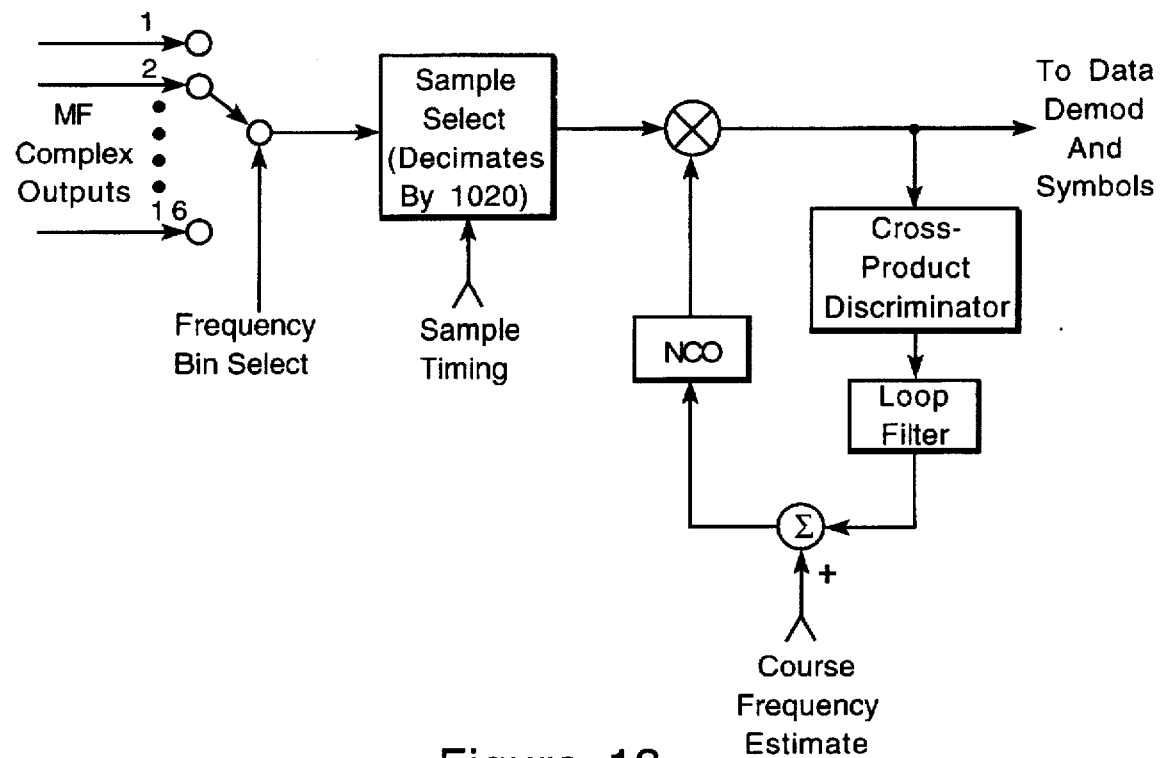
FIG. 13 is a block diagram of the circuit for frequency correction of the decimated MF output before data demodulation.

The frequency estimates are used to remove the frequency error of the baseband signal before routing to the data demodulator as shown in FIG. 13.

Coarse Frequency Estimate

The coarse estimate is performed as follows:

The coefficients of the quadratic equation $y=cf^2+bf+a$ are chosen to give the best fit to the SDT entry corresponding to a signal detection and its two adjacent frequency bin entries.

The signal center frequency is then estimated as $\bar{f}=-b/2c$.

Figure 14:
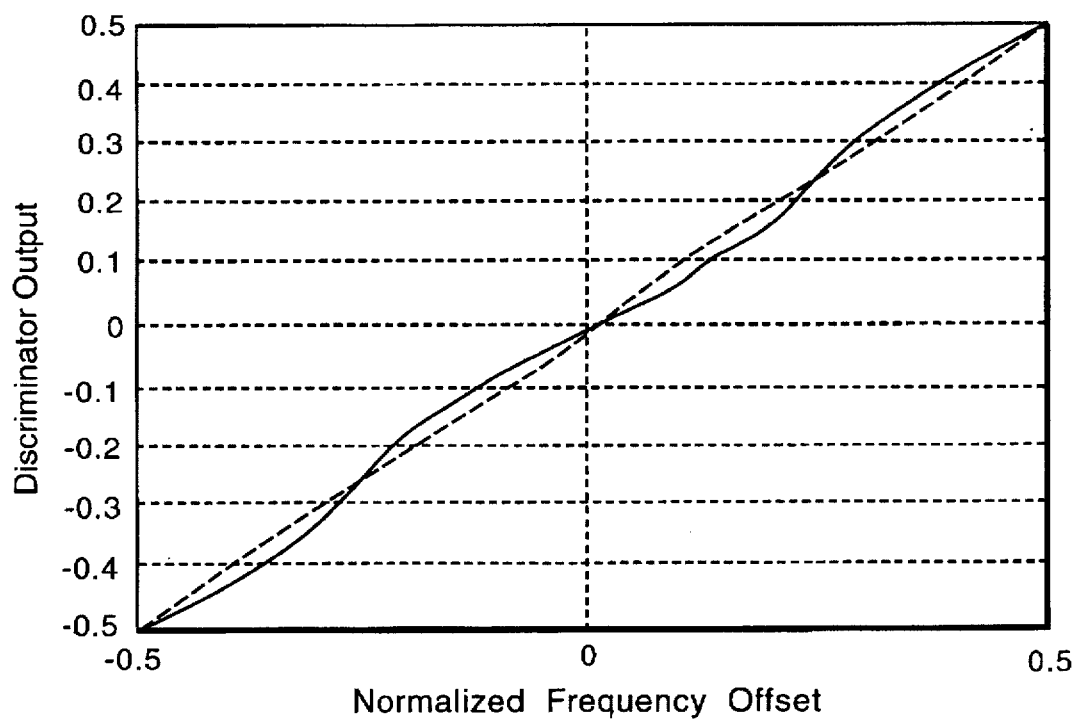
FIG. 14 is a curve of the quadrature fit frequency discriminator.
Figure 15:
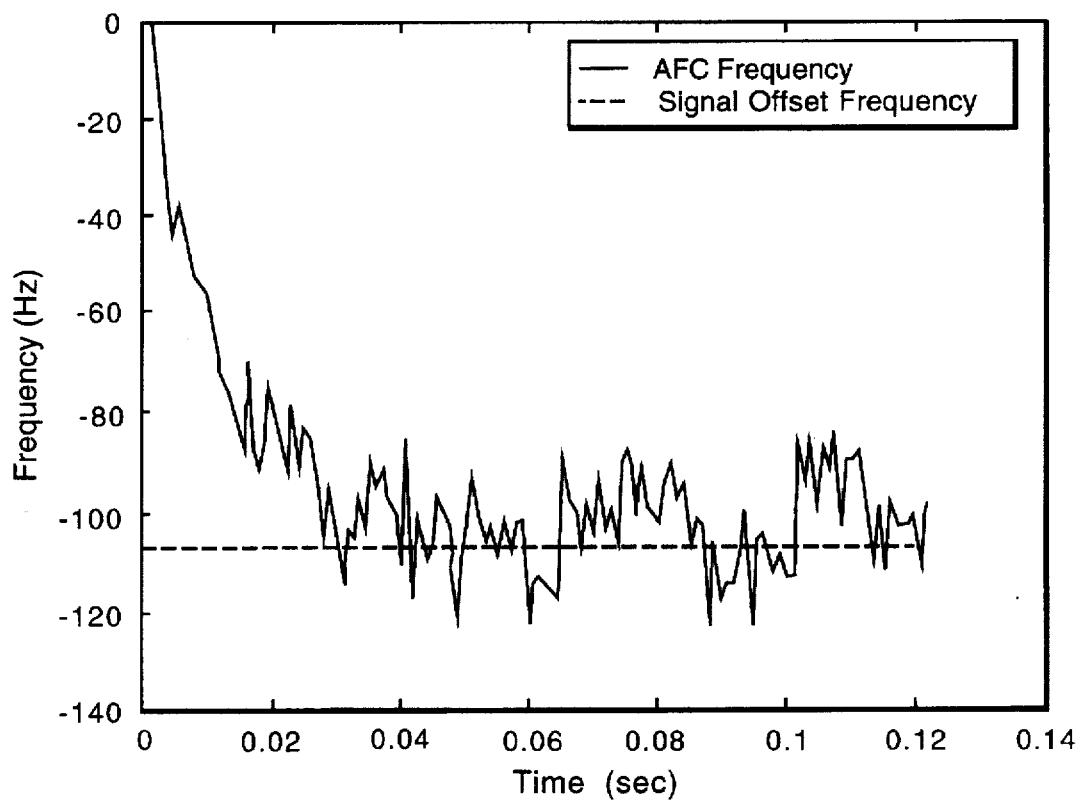
FIG. 15 is a plot of the AFC loop pull-in and tracking performance with C/No 36 dB-Hz, BL=32 Hz, dfz-107 Hz.

This algorithm gives the discriminator curve shown in FIG. 14. Note that there is a small systematic error which cat) be removed if desired. The expected accuracy is $\sigma_f=27$ Hz at minimum signal level as discussed hereafter.

Cross-Product AFC

Figure 12:
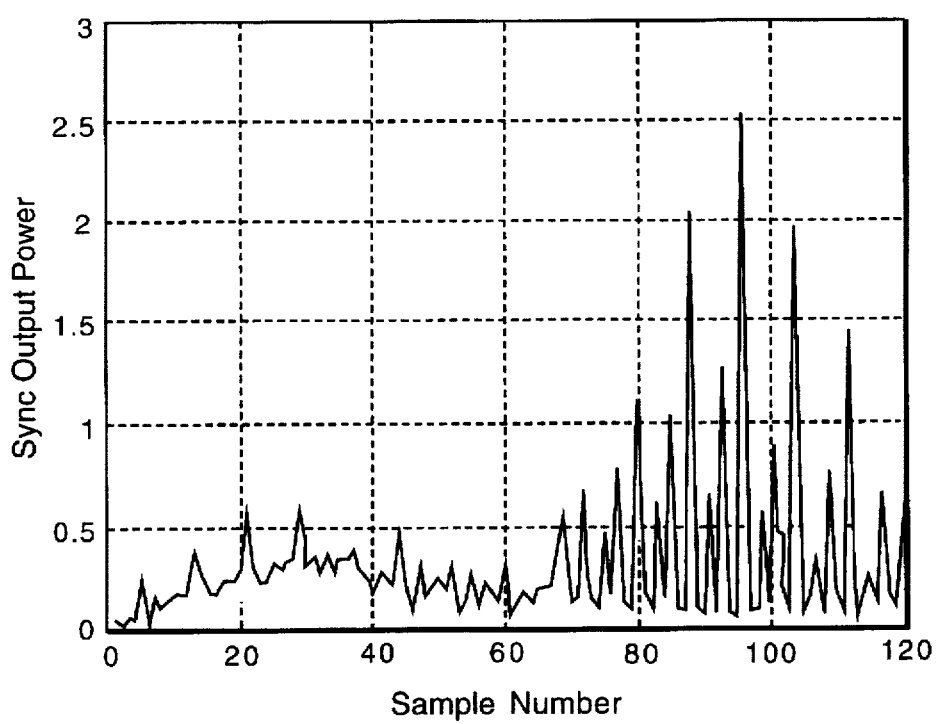
FIG. 12 is a graph illustrating sync output power after noncoherent post detection combining of 4 samples.

The received baseband signal is sampled at the output of the MF so that only those samples corresponding to a correlation peak are routed for further processing and data demodulation as discussed above. This decimated baseband signal is frequency corrected by the coarse frequency estimate as shown in FIG. 12. The AFC loop is then activated to further reduce frequency error.

The AFC is implemented using the cross product AFC (CPAFC) algorithm which is described in detail in Natalie, F. D., AFC Tracking Algorithms", IEEE Transactions on Communications, August, 1984. The discriminator curve is given by the equation:

$$D_e(\omega) = A^2 \text{sinc}^2\left(\frac{\Delta\omega T_L}{2}\right) \sin\Delta\omega T_L$$

where A is the signal amplitude at the detector input, and TL is the PN code period. The loop has a pull-in range of about $0.21\Delta\omega T_L$ or 224 Hz. Typical tracking performance with a loop bandwidth of 32 Hz is shown in FIG. 14. Note that the loop settles in about 40 ms.

Frame and Word Synchronization

Figure 11:
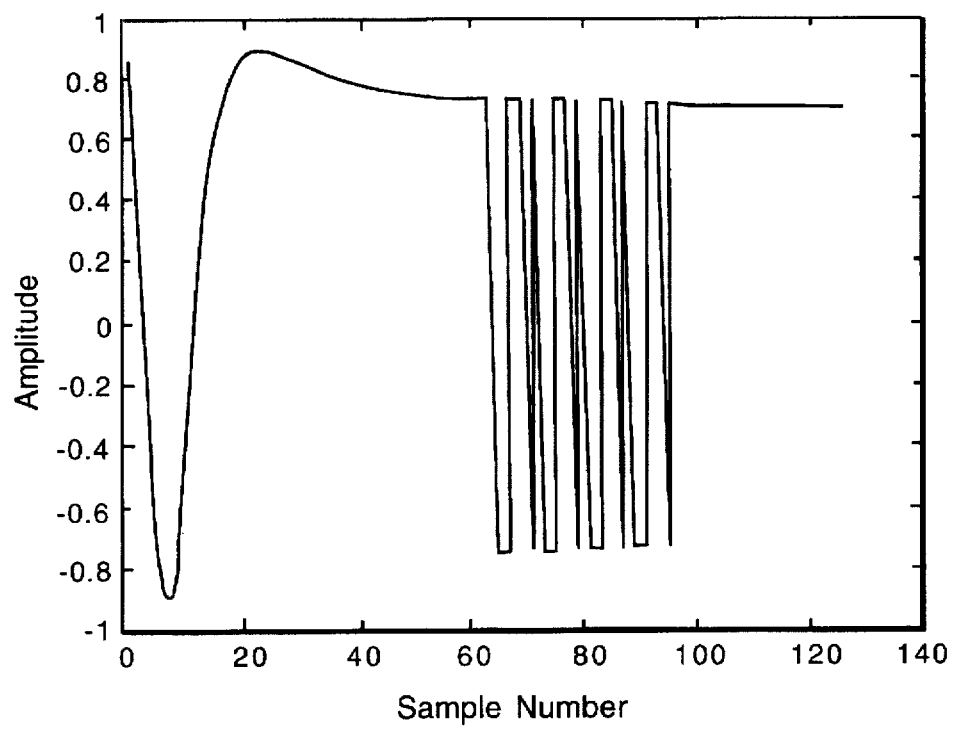
FIG. 11 is a graph illustrating the real part of the baseband signal with sync modulation without noise after AFC frequency correction.

As mentioned above, the Frame and Word Sync Field is characterized by a length 8 Neuman-Hofman synchronization word which is mod(2) added to the PN spreading sequence before bi-phase modulation of the signal. One symbol of the sync word is exactly a PN sequence long. The spreading sequence and sync word transitions are synchronized to occur at the same time. The Sync Field is 30 ms long, which corresponds to 32 repetitions of the PN code and 4 repetitions of the sync word. FIG. 11 shows the real part of the baseband signal with sync modulation after frequency correction by the AFC loop when no noise is present. This plot depicts the baseband waveform after sample decimation so that there is one sample per PN code period (0.9375 ms). The first part of the time history shows the transient due to the AFC pull-in during the Acquisition Field. The phase transitions due to the sync word modulation are present during the Sync Field.

The sync sequence is detected with a MF that is 8 symbols (one sync word) long. Post detection noncoherent combining of the output of this filter is accomplished with a sliding accumulator which sums 4 samples spaced by the sync word length. Note that the MF has a frequency response with first nulls at the inverse of the filter length. i.e. 133.3 Hz. There will be little degradation due to frequency offset because the AFC is small compared with the filter bandwidth. Increasing the filter length before combining, while giving better noise performance, would cause the filter to become unacceptably narrow.

The sync filter power output waveform is shown in FIG. 12. Note that there are a number of subsidiary correlation peaks which must be discriminated against in order to avoid a false sync. Detection of the correct sync position is important since it gives frame sync and data code word sync.

Data Demodulation

Data is transmitted using an 8-ary orthogonal code word set which is bi-phase modulated on the carrier as discussed earlier. Correct detection of the sync field gives the necessary timing, as discussed above.

Noncoherent data detection is implemented by observing the power output of a bank of 8 FIR filters matched to the 8 code words. The code word corresponding to the filter with the largest output power is declared the winner and the appropriate data bits are output by the data demodulator.

Transmitter Description

Figure 16:
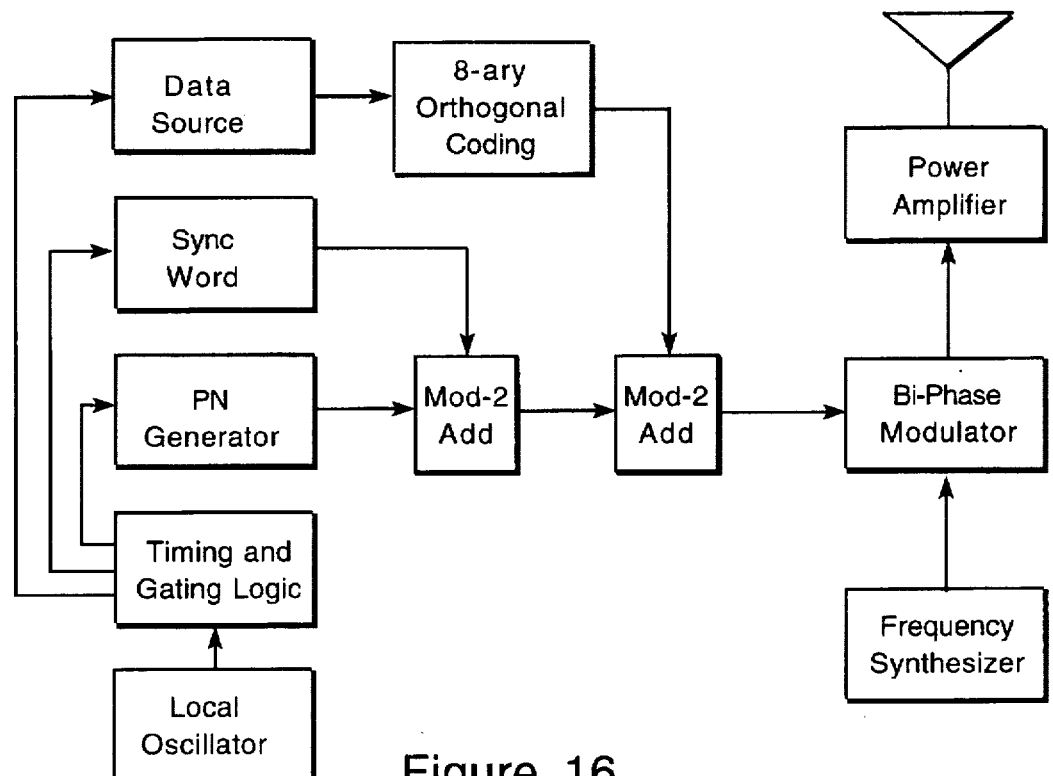
FIG. 16 is a functional block diagram of an RAC transmitter incorporating the invention.

A functional block diagram of the RAC signal transmitter is shown in FIG. 16. During the Acquisition Field both the data and sync sources are gated off, and only the PN code is modulated onto the carrier. The sync word is gated on and mod-2 added to the PN code during the Sync Field and then gated off. The data source is gated on and mod-2 added to the PN code during the data field. The resultant baseband signal is bi-phase modulated onto the carrier.

What is claimed is:

1. In a spread spectrum CDMA communication system in which a station transmits a short synchronization signal to allow a second station to (1) recognize that a signal is present, (2) resolve frequency uncertainty, (3) acquire the spreading code timing, (4) acquire frame and symbol synchronization, and (5) demodulate data which may contain user identification and other data, the improvement comprising:

means for generating and transmitting a burst signal comprising an Acquisition Field during which the carrier is biphase modulated with a pseudo-noise (PN) sequence, a Sync Field during which a synchronization sequence is mod-2 added to the PN sequence with one chip of the sync sequence equal to one or more periods of the PN sequence, and a data field with m-ary orthogonal code words mod-2 added to the PN sequence with one chip of the code word equal to one or more periods of the PN sequence.

2. The spread spectrum CDMA communication system defined in claim 1, in which said second station has a receiver which comprises a bank of filters matched to the PN sequence and covering the frequency uncertainty range of the received signal, the output samples over the PN code length are noncoherently combined with samples of the same code time phase from previous intervals to form a Signal Detection Table (SDT) of signal power versus code phase for each filter in the filter bank, the contents of the SDT are used for signal detection and time and frequency bin selection and time offset and coarse frequency offset estimates are also based on the contents of the SDT, said receiver also includes means to demodulate the m-ary data either noncoherently or coherently.

3. The spread spectrum CDMA communication system as defined in claim 2, in which said bank of matched filters is implemented as a single shift register and multiple tap weight networks matched to different frequencies.

4. An orthogonal CDMA (OCDMA) communication system comprising a base station receiver means for receiving a plurality of spread spectrum signals from a corresponding plurality of subscriber stations on a selected frequency channel, each signal from a subscriber station being composed of data symbols overlaid with one set of orthogonal functions and a PN sequence, the signals from subscriber stations being synchronized to arrive at the base station in time and frequency synchronism, a subscriber station Return Access Channel (RAC) comprised of a transmitter means at the subscriber station for transmitting a spread spectrum RAC burst signal in an assigned frequency band to allow the base station to (1) recognize that a signal is present, (2) resolve frequency uncertainty, (3) acquire the spreading code timing, (4) acquire frame and symbol synchronization, and (5) demodulate data which may contain user identification and other data, and means for transmitting a burst signal consisting of an Acquisition Field during which the carrier is biphase modulated with a pseudo-noise (PN) sequence, a Sync Field during which a synchronization sequence is mod-2 added to the PN sequence with one chip of the sync sequence equal to one or more periods of the PN sequence, and a data field with m-ary orthogonal code words mod-2 added to the PN sequence with one chip of the code word equal to one or more periods of the PN sequence.

5. The OCDMA communication system defined in claim 4, in which the base station receiver comprises a bank of filters matched (BMF) to the PN sequence and covering the frequency uncertainty range of the received signal, output samples of said BMF over the PN code length are noncoherently combined with samples of the same code time phase from previous intervals to form a Signal Detection Table (SDT) of signal power versus code phase for each filter in the filter bank and the contents of the SDT are used for signal detection and time and frequency bin selection, time offset and coarse frequency offset estimates are also based on the contents of the SDT, and said receiver includes means to demodulate the m-ary data either noncoherently or coherently.

6. The OCDMA communication system defined in claim 5, in which the said bank of matched filters is implemented as a single shift register and multiple tap weight networks matched to different frequencies.

7. The OCDMA communication system defined in claim 4, which further comprises at least one repeater for receiving the subscriber signals and translating them to a form suitable for the base station.

8. The OCDMA communication system defined in claim 7 in which the repeater is a satellite.

* * * * *